Sept. 30, 1969   R. D. SHELTON   3,470,466
ELECTRON BEAM INSTRUMENT FOR MEASURING ELECTRIC FIELDS
Filed Oct. 10, 1967   2 Sheets-Sheet 1

INVENTOR(S)
RUSSELL D. SHELTON

BY

ATTORNEYS

United States Patent Office 3,470,466
Patented Sept. 30, 1969

3,470,466
ELECTRON BEAM INSTRUMENT FOR MEASURING ELECTRIC FIELDS
Russell D. Shelton, Huntsville, Ala., assignor to the United States of America as represented by the Administrator of the National Aeronautics and Space Administration
Filed Oct. 10, 1967, Ser. No. 674,356
Int. Cl. G01r 31/02
U.S. Cl. 324—72                    2 Claims

ABSTRACT OF THE DISCLOSURE

An apparatus for determining electric field strength including an electron discharge device for directing an electron beam in a circular sweep so as to normally impinge for an equal time period each segment of a target having four segments arranged in diametrically opposite pairs, said beam being deflectable by an electric field to vary the time each segment is impinged. Control deflection plates are provided to act upon the electron beam in opposition to the applied electric field and the deflection plates are energized in accordance with variations in the time diametrically opposite segments are impinged so as to establish a state of equilibrium between the deflection caused by the applied electric field and the deflection caused by the control deflection plates. The energy required to effect this state of equilibrium is proportional to the applied electric field.

Background of the invention

The invention described herein was made by an employee of the United Statest Government and may be manufactured and used by or for the Government for governmental purposes without the payment of any royalties thereon or therefor.

This invention relates to electron discharge devices and more particularly to electron beam deflection devices for measuring electric fields.

The recent advent of space flight has placed a greater demand on instruments originally designed to operate within the earth's atmosphere because of the hostile environment of interplanetary space. For example, in the area of measurement of electric fields of the order of one volt per meter, the use of conventional field meters of the induction type have proved to be difficult in interplanetary space because of the interaction of energetic photons, energetic charged particles, or plasma with the metallic surfaces of the field meters. Also, problems with bearings and lubricants in the vacuum of space diminish the reliability of conventional field meters.

According to the present invention these disadvantages may be overcome by employing an electron beam device in which use is made of the direct relationship between the strength of an electric field and the deflection of an electron beam. Instruments in which use is made of this relationship are known in the art, but previous applications are believed to be too complex and to require excessively difficult manufacturing techniques.

It is therefore an object of this invention to provide an electrical field meter suitable for use in interplanetary space.

Another object of this invention is to provide an improved electron beam deflection device for providing output signals indicative of the deflection of the electron beam.

Still another object of this invention is to provide a simpler and more dependable electron beam deflection device.

Summary of the invention

According to the invention an electric field meter utilizing an electron beam device is constructed around the use of a segmented electron receiving means. The use of a segmented electron receiving means is made possible by the novel technique of directing the electron beam in a circular sweep so that the time impinged and the number of electrons intercepted by a given segment is dependent on the deflection of the electron beam caused by the electric field. This technique coupled with the unique use of control deflecting means energized in accordance with the time each segment is impinged allows the electron beam to be placed in a state of equilibrium with the energy required to effect this state being proportional to the electric field.

Description of the drawings

These and other objects of this invention will be apparent from the following description taken in accordance with the accompanying drawings in which:

Referring now to FIGURE 1, the electron beam deflecting device includes a filament 11, heated from a suitable source of current, for heating a cathode 13 to cause emission of electrons therefrom. These electrons are accelerated and focused into a beam 16 by a concentrating and accelerating electrode 15 which is maintained at ground potential and the cathode 13 is held at a negative potential with respect to ground by means of battery 17.

Figure 1:
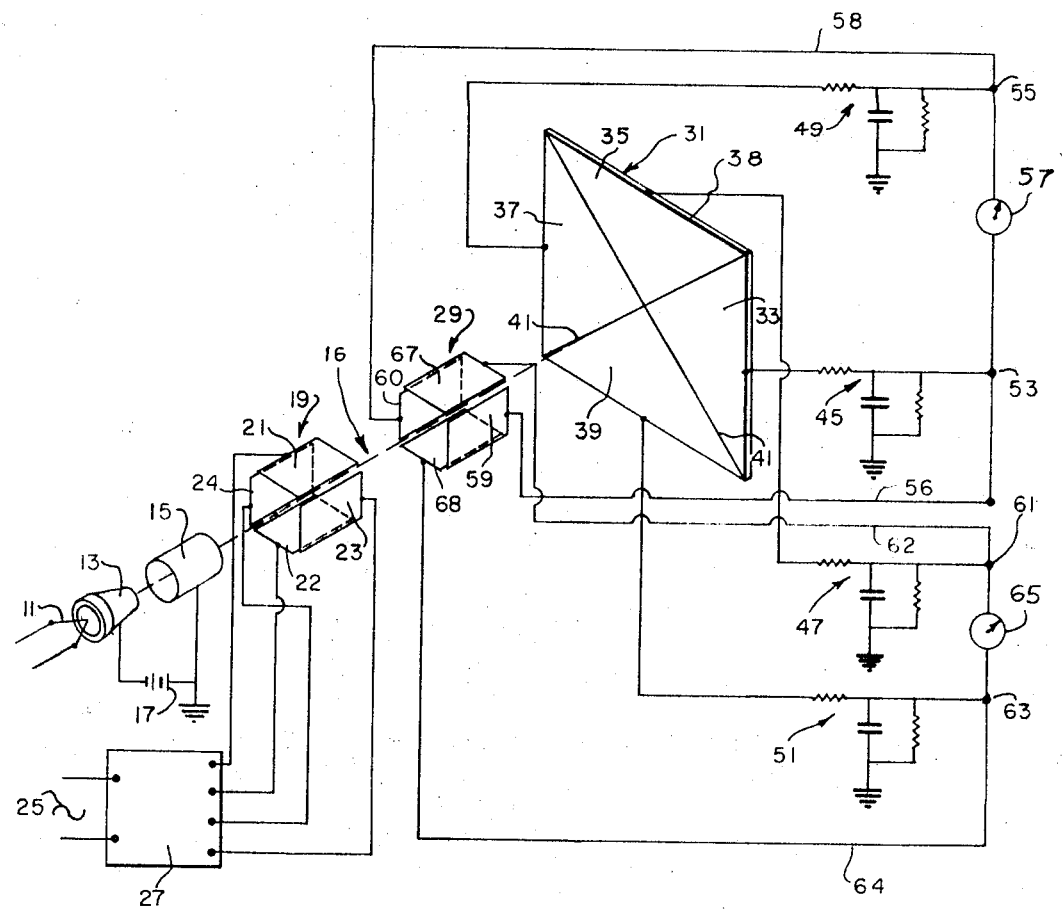
FIGURE 1 is a diagrammatic view showing the essential component parts of the electron beam deflection device and the relationship of such parts to one another.

The electron beam 16 emitted by the cathode 13 is deflected in a circular sweep by a primary deflecting circuit 19 consisting of vertical control deflection plates 21 and 22, horizontal control deflecting plates 23 and 24, sinusoidal generator 25 and phase shifting network 27. In operation, the sinusoidal generator 25 energizes the phase shifting network 27 for obtaining two equal AC output signals that are 90° out of phase. In the well known manner one output of the phase shifting network is applied to charge the horizontal deflecting plates 23 while the other output is applied to charge the vertical deflecting plates 21 so that a circular sweep of the electron beam is obtained.

Figure 2:
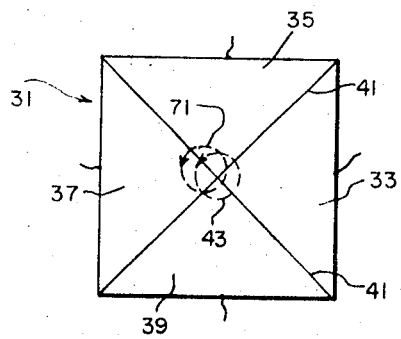
FIGURE 2 illustrates the collector electrode and a normal and deflected path of the electron beam.

The electron beam 16 is directed to pass through control deflecting plates 29 consisting of horizontal control deflecting plates 59 and 60 and vertical control deflecting plates 67 and 68 so as to impinge on target electrode 31. As shown in FIGURES 1 and 2, the target electrode 31 includes a plurality of segments 33, 35, 37 and 39 of equal size and triangular in shape with segments 33 and 37 and segments 35 and 39 forming horizontal and vertical symmetrical pairs respectively. Each of the segments is made of a conductive material having a relatively low resistance and are separated by an insulting material 41. The segments 33, 35, 37 and 39 are mounted in coplanar relation on a back plate 38 and positioned so that the impingement of the beam in its normal sweep impinges each segment an equal time, as indicated by circle 43 in FIGURE 2.

The electron beam impinging on the segments 33, 35, 37 and 39 is converted into suitable voltage levels by low pass filters or averaging circuits 45, 47, 49 and 51 which couple the respective segments to ground. The output terminals 53 and 55 of low pass filters 45 and 49 are connected in opposition to an output device 57, such as a meter, and in opposition to the horizontal deflecting plates 59 and 60 of the control deflecting plates 29 by leads 56 and 58 respectively. Likewise the output terminals 61 and 63 of low pass filters 47 and 51 are connected in opposition to an output device 65, such as a meter, and in opposition to the vertical deflecting plates 67 and 68 of the control deflecting plates 29 by leads 62 and 64. It will be understood that the electron beam 16 will be deflected by the control defletcing plates 29 in accordance with the difference in voltage applied to the horizontal deflecting plates 59 and 60 and the vertical deflecting plates 67 and 68.

Figure 3:
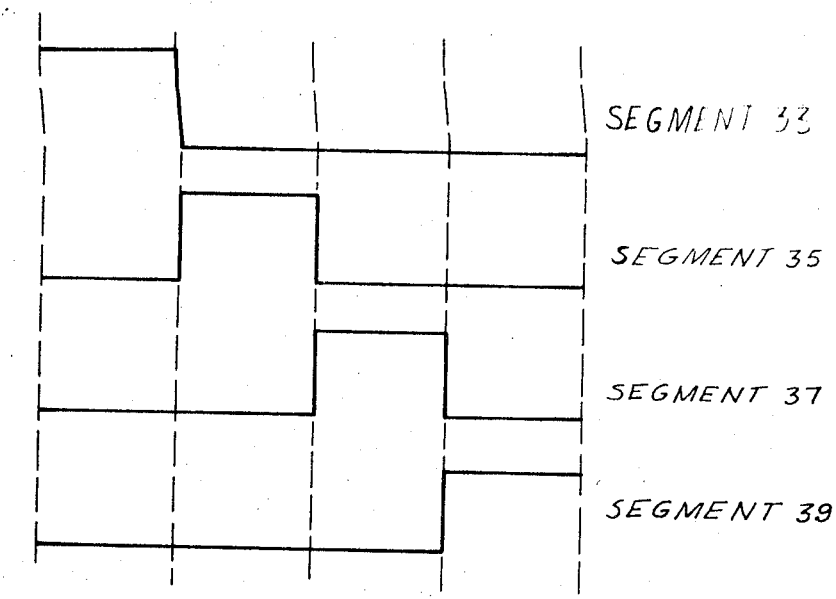
FIGURES 3 and 4 are graphs illustrating various waveforms appearing on the target electrode of the electron beam of deflection device.

In operation, when the electron beam sweep is aligned as indicated at 43 in FIGURE 2 and no electric field is present, the waveform of the signals from target segments 33, 35, 37 and 39 applied to low pass filters 45, 47, 49 and 51 will be square waves of equal amplitude and width as shown in FIGURE 3. As the beam sweeps the segments 33, 35, 37 and 39 the current provided by the incident beam of electrons charges in sequence the respective capacitors of the low pass filters 45, 47, 49 and 51 in accordance with their respective time constants. As will readily be seen the voltage apeparing on the output terminals 53, 55, 61 and 63 is directly related to the time period that the electron beam impinges any one segment of the target 31. Thus, under normal conditions the average potential appearing on the output terminals 53, 55, 61 and 63 will be equal since each segment of the target 31 is impinged an equal time so that the voltages applied to the control deflection plates 29 and load device 57 and 65 will neutralize each other.

Figure 4:
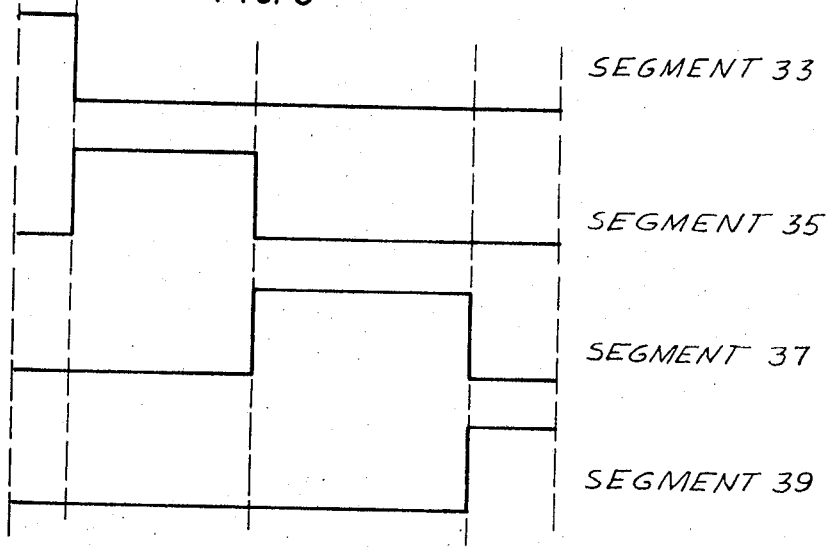

However, when an electric field is present, the beam will be deflected from its normal sweep in accordance with the strength and direction of the electric field as indicated by way of example at 71 in FIGURE 2. The signal waveform obtained from each segment of the target will thereby change as shown in FIGURE 4. Under these conditions, the signal waveforms applied to the low pass filters 45 and 49 from segments 33 and 37 respectively will still be of equal amplitude but will be of unequal width. In the example shown the signal applied to low pass filter 45 would be of shorter duration than the signal applied to low pass filter 49. Accordingly, the average potential level of output terminal 55 will be higher than the average potential level of output terminal 53 so that a potential difference will be applied across horizontal control deflecting plates 59 and 60 and load device 57. In the same manner low pass filter 47 will be energized a longer time period than low pass filter 51. Accordingly, the average potential level of output terminal 61 will be higher than the average potential level of output terminal 63 so that a potential difference will be applied across vertical control deflecting plates 67 and 68 and load device 65.

The potential differences applied to the vertical and horizontal control deflecting plates act in opposition to the deflection caused by the electric field and the electron beam will assume a position of equilibrium where the effects of the two deflecting forces are balanced. Under this condition, the voltage supplied to load devices 57 and 65 have a definite relation to the value of the applied electric field. The proportion or ratio between the electric field and the signal supplied to load devices 57 and 65 may be adjusted or controlled by adjustment of the time constant of the low pass filters 45, 47, 49 and 51.

In the arrangement described herein an increasing deflection of the beam from a normal sweep pattern results in the establishment of increasing energy in the output circuit. In this arragement the deflection is accomplished by placing the device at the location in outer space where it is desired to measure the electric field. It will be understood however that for operation on earth the device may be provided with an evacuated chamber and additional deflecting plates may be provided for deflecting the electron beam in accordance with an input signal.

It will be obvious to those skilled in the art that many other variations and modifications may be made without departing from the spirit and scope of the invention. Therefore, this invention is to be considered as limited only in accordance with the teachings thereof as set forth in the claims appended hereto.

I claim:

1. An electron beam electric field measuring instrument comprising:

means for producing an electron beam;

a target assembly comprising first and second pairs of electrically conductive segments, said first pair of segments disposed in opposed relationship along a first axis and said second pair of segments disposed in opposed relationship along a second axis normal to said first axis;

means for deflecting said electron beam in a circular sweep so as to normally impinge upon each of said segments an equal time;

said beam being deflectable in response to an external electrical field to be measured to vary the path of impingement of said beam of electrons thereby varying the time each segment is impinged;

a detecting circuit electrically connected to each of said segments, each of said detecting circuits including means for establishing an output voltage whose magnitude is dependent on the time each segment is impinged;

a first pair of deflection plates disposed on opposite sides of said beam path for deflecting said beam along said first axis;

a second pair of deflection plates disposed on opposite sides of said beam path for deflecting said beam along said second axis;

means connecting the outputs of said detecting circuits associated with said first pair of segments to the input of said first deflection plates in a direction tending to deflect said beam opposite to the direction of deflection caused by said electric field;

means connecting the outputs of said detecting circuits associated with said second pair of segments to the input of said second deflection plates in a direction tending to deflect said beam opposite to the direction of deflection caused by said electric field;

means to compare the output voltages of said detecting circuits associated with said first pair of segments for deriving a signal indicative of the electric field along said first axis; and means to compare the output voltages of said detecting circuits associated with said second pair of segments for deriving a signal indicative of the electric field along said second axis.

2. The apparatus of claim 1 wherein said means for establishing an output voltage dependent on the time each segment is impinged comprises a low pass filter.

References Cited

UNITED STATES PATENTS

| 1,960,333 | 5/1934  | Du Mont        | 324—109 XR |
| 2,368,328 | 1/1945  | Rosencrans     | 313—89 XR  |
| 2,534,372 | 12/1950 | Ring           | 324—88 XR  |
| 3,090,240 | 5/1963  | Nashman et al. | 73—517     |

RUDOLPH V. ROLINEC, Primary Examiner

E. F. KARLSEN, Assistant Examiner

U.S. Cl. X.R.

324—109, 121